UNITED STATES PATENT OFFICE.

HANS BELART, OF HUDDERSFIELD, ENGLAND.

MEDICINAL PREPARATION FOR HUMAN USE.

1,129,270.                  Specification of Letters Patent.     Patented Feb. 23, 1915.

No Drawing.         Application filed October 8, 1913.   Serial No. 793,995.

*To all whom it may concern:*

Be it known that I, HANS BELART, residing at 29 Upper George street, Huddersfield, in the county of York, England, have invented certain new and useful Improvements in Medicinal Preparations for Human Use; and I do hereby declare the following to be a full, clear, and exact description of the invention, such as will enable others skilled in the art to which it appertains to make and use the same.

This invention relates to new products or preparations to be used internally in the medical treatment of human beings, which products are formed by the combination of glycerophosphoric salts of casein or other albuminous matters, such as albumin of eggs or blood, or vegetable albumins, with oxyquinolin or its derivatives, thus combining the well known action of the former product with the extremely high disinfecting power of the latter. I may employ para-, meta-, or ortho-oxyquinolin, or a mixture of any two or all three of these; and the glycerophosphoric salts referred to may be calcium, sodium, potassium or any other suitable metallic salt.

Example: Firstly, 600 grams of glycerophosphoric acid salts of casein are dissolved in 6 liters of warm water, say at a temperature of 50° C., and to this solution are added 750 grams of sodium chlorid. Secondly, 120 grams of oxyquinolin, or an equivalent amount of one of its derivatives (such as sulfo compounds or chlorinated or bromin compounds), are dissolved with 300 grams of caustic soda of 30% strength in two liters of water. Thirdly, the above two solutions are mixed, and diluted sulfuric acid of 15 to 20% strength is added while stirring until the mixture when tested is found to have become distinctly acid. Other suitable mineral or organic acid, such as hydrochloric or acetic, may be used instead of sulfuric acid. Fourthly, the liquid is filtered off from the above mixture, and the residuum washed with cold water, pressed and dried. The product in a dry state is a gray powder, which is more or less soluble according to the derivatives of oxyquinolin which have been used.

The glycerophosphoric acid salt of albuminous matter combines with the oxyquinolin during the reaction and produces a single novel compound substance. A small quantity of sulfates or chlorids are formed during the reaction, but they are negligible to the medicinal result of the new substance.

This new substance when taken internally promotes the assimilation of food, and it has a tonic and disinfectant action. It is useful in the treatment of coughs, colds, fevers, anemia, neuralgia, debility and other ailments. The novel compound or substance resists the action of the normal contents of the stomach, and is broken up by the alkaline action of the bile and other secretions in the bowels.

The new substance is a neutral gray powder, and when heated it does not melt, but decomposes into gas and ash.

What I claim is:

A new article of manufacture, for use as a medicine, comprising a substance formed by the reaction of oxyquinolin on a glycerophosphoric salt of albuminous matter, said substance being a gray neutral powder, which decomposes into gas and ash when heated, and which is decomposed by the alkaline contents of the bowels.

In testimony whereof I affix my signature, in presence of two witnesses.

HANS BELART.

Witnesses:
  ERNEST PRIESTLEY NEWTON,
  JAMES LESLIE WILKINSON.